United States Patent
Tatsumoto et al.

(10) Patent No.: US 12,210,306 B2
(45) Date of Patent: Jan. 28, 2025

(54) IMAGE FORMING SYSTEM, RESISTANCE DETECTION DEVICE, RESISTANCE DETECTION METHOD, AND PROGRAM

(71) Applicant: KONICA MINOLTA, INC., Tokyo (JP)

(72) Inventors: Yuhei Tatsumoto, Hino (JP); Akimasa Ishikawa, Hino (JP); Makoto Shimazoe, Toyokawa (JP); Yuta Tachibana, Toyokawa (JP); Kouei Cho, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/134,262

(22) Filed: Apr. 13, 2023

(65) Prior Publication Data

US 2023/0375968 A1    Nov. 23, 2023

(30) Foreign Application Priority Data

May 23, 2022    (JP) .................................. 2022-083543

(51) Int. Cl.
*G03G 15/00*    (2006.01)
*G06K 15/00*    (2006.01)

(52) U.S. Cl.
CPC ..... *G03G 15/5029* (2013.01); *G06K 15/4065* (2013.01)

(58) Field of Classification Search
CPC .................. G03G 15/5029; G06K 15/4065
See application file for complete search history.

(56) References Cited

U.S. PATENT DOCUMENTS

| | | | |
|---|---|---|---|
| 11,300,911 B2 | 4/2022 | Koide et al. | |
| 2004/0190921 A1* | 9/2004 | Bae ..................... | G03G 15/0266 399/50 |
| 2016/0041510 A1* | 2/2016 | Kojima ............... | G03G 15/235 399/314 |
| 2016/0229203 A1* | 8/2016 | Gerlach ............. | G03G 15/1695 |
| 2019/0154606 A1* | 5/2019 | Schneider .......... | G03G 15/6588 |
| 2022/0113657 A1* | 4/2022 | Shimomura ......... | G03G 15/161 |
| 2023/0099533 A1* | 3/2023 | Hirose ............... | G03G 15/0266 399/50 |

FOREIGN PATENT DOCUMENTS

JP    2006215383 A    8/2006

* cited by examiner

*Primary Examiner* — David H Banh
(74) *Attorney, Agent, or Firm* — Holtz, Holtz & Volek PC

(57) ABSTRACT

Provided is an image forming system capable of accurately detecting the resistance of a recording material. The image forming system includes an application roller that applies a voltage to a recording material on a conveyance path, and a controller that calculates the electric resistance of the recording material from a relationship between the voltage applied to the application roller and a current. The controller calculates the resistance of the recording material based on first profile information that is acquired by changing the applied voltage and corresponds to a change in the resistance of the application roller, and second profile information that is acquired by changing the applied voltage in a state where the recording material is sandwiched and corresponds to the change in the resistance of the application roller.

13 Claims, 9 Drawing Sheets

V: HV OUTPUT VOLTAGE
I: OUTPUT CURRENT
Vr: ROLLER APPLIED VOLTAGE
Vp: RECORDING MATERIAL APPLIED VOLTAGE
Rr: ROLLER RESISTANCE
Rp: RECORDING MATERIAL RESISTANCE

V: HV OUTPUT VOLTAGE
I: OUTPUT CURRENT
Vr: ROLLER APPLIED VOLTAGE
Rr: ROLLER RESISTANCE

CALCULATION OF DIVIDED VOLTAGE
AND RECORDING MATERIAL RESISTANCE

| | ITEM | LEVEL | VOLTAGE [-V] | CURRENT [-uA] | RESISTANCE [MΩ] |
|---|---|---|---|---|---|
| STEP (3) | ROLLER | (1) | 302 | 2.89 | 104.4 |
| | | (2) | 2524 | 26.8 | 94.2 |
| | RECORDING MATERIAL | (1) | 698 | 2.89 | 241.6 |
| | | (2) | 2476 | 26.8 | 92.4 |

IMAGE FORMING SYSTEM, RESISTANCE DETECTION DEVICE, RESISTANCE DETECTION METHOD, AND PROGRAM

CROSS-REFERENCE TO RELATED APPLICATIONS

The entire disclosure of Japanese patent Application No. 2022-83543, filed on May 23, 2022, is incorporated herein by reference in its entirety.

BACKGROUND

Technological Field

The present invention relates to an image forming system, a resistance detection device, a resistance detection method, and a program.

Description of the Related Art

In an image forming device, a control parameter for each physical property value of a recording material is appropriately set to deal with a wide variety of recording materials, thereby providing a high-quality product without image quality degradation due to wrinkles, clogging, or the like of the recording material. As such an image forming device, for example, a configuration has been proposed in which a voltage is applied to a conveyance roller on a conveyance path of the recording material to detect the resistance of the recording material (refer to, for example, Patent Literature 1). In this configuration of the image forming device, resistance detection of the recording material is performed by changing the applied voltage while the recording material is sandwiched between the conveyance rollers for resistance detection. For example, at the beginning of detection, a lower voltage is applied to detect the resistance, assuming that the resistance of the recording material is low. When the detection current at the time of resistance detection is equal to or less than a reference, resistance detection is performed again by increasing the applied voltage. Then, the resistance of the recording material is obtained from a difference between the detected resistance and the known resistance of the roller.

Related Art Literature

PATENT LITERATURE

Patent Literature 1: JP 2006-215383 A

SUMMARY

In the resistance detection described above, it is assumed that the resistance of the conveyance roller for resistance detection is known in advance. In order to stably sandwich various kinds of recording materials with rollers when detecting the resistance of the recording material, it is necessary to use a conductive elastic roller such as conductive rubber. However, the conductive rubber or the like has a characteristic that electric resistance changes according to the applied voltage.

In addition, the electric resistance of the recording material may also change according to the applied voltage due to the characteristic of the internal structure. For this reason, it is necessary to make the voltage applied to the recording material constant when detecting the resistance of the recording material.

However, the voltage applied to the recording material is determined by a resistive divided voltage between the recording material and the conveyance roller for resistance detection, but the electric resistance of the conveyance roller for resistance detection changes according to the applied voltage. Thus, it is difficult to make the voltage applied to the recording material constant. Therefore, the resistance of the recording material cannot be accurately detected.

In order to solve the above-described problem, the present invention provides an image forming system, a resistance detection device, a resistance detection method, and a program capable of accurately detecting the resistance of the recording material.

In order to achieve at least one of the above-described objects, the image forming system reflecting one aspect of the present invention includes the following. The image forming system includes an application roller that applies a voltage to a recording material on a conveyance path, and a controller that calculates the electric resistance of the recording material from a relationship between the voltage applied to the application roller and the current. The controller calculates the resistance of the recording material based on first profile information that is acquired by changing the applied voltage and corresponds to a change in the resistance of the application roller, and second profile information that is acquired by changing the applied voltage in a state where the recording material is sandwiched and corresponds to the change in the resistance of the application roller.

According to an embodiment of the present invention, it is possible to provide the image forming system, the resistance detection device, the resistance detection method, and the program capable of accurately detecting the resistance of the recording material.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Hereinafter, examples of embodiments of the present invention will be described, but the present invention is not limited to the following examples.

<Embodiment of Resistance Detection Device and Image Forming System>

Figure 1:
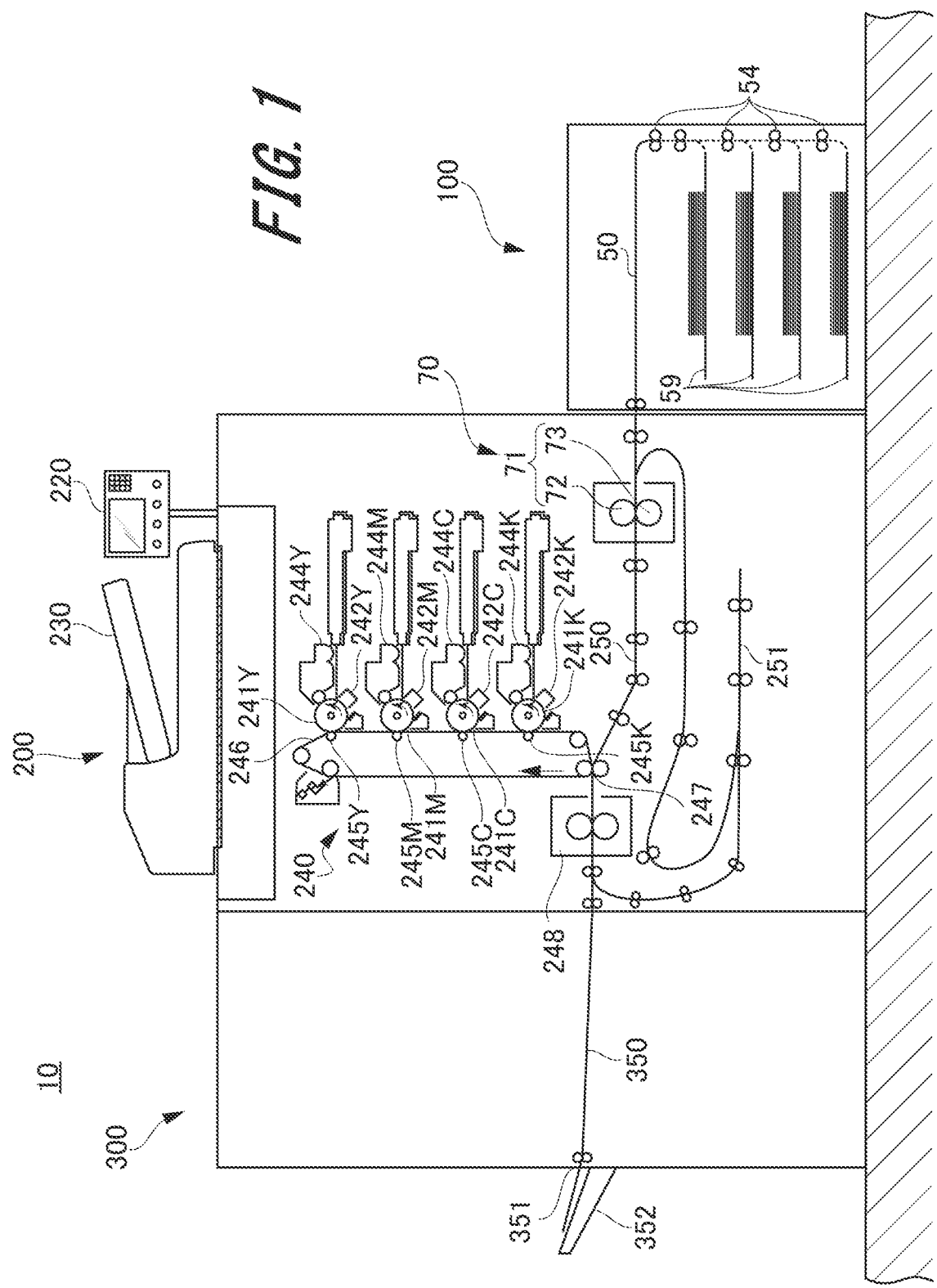
FIG. 1 is a diagram illustrating a schematic configuration of an image forming system.

FIG. 1 is a schematic configuration diagram of an image forming system according to the present embodiment.

An image forming system 10 illustrated in FIG. 1 includes a recording material supply device 100, an image forming device 200, and a post-processing device 300.

In the image forming system 10, a recording material S stacked in the recording material supply device 100 is supplied to the image forming device 200. Then, an image is formed on the recording material S at the image forming device 200. Thereafter, the recording material S is conveyed from the image forming device 200 to the post-processing device 300. Then, predetermined post-processing is performed on the recording material S after image formation processing at the post-processing device 300. Thereafter, the recording material S is discharged from the post-processing device 300 to the outside of the image forming system 10.

[Recording Material Supply Device]

The recording material supply device 100 accommodates the recording material S for image formation in the image forming system 10, and supplies the recording material S to the image forming device 200 in response to an image formation job. As illustrated in FIG. 1, the recording material supply device 100 includes a conveyance unit 50, a recording material supply unit 59 as a recording material storage, and the like.

The recording material supply unit 59 includes, for example, a plurality of sheet supply trays disposed in the recording material supply device 100. The recording material supply unit 59 can carry a plurality of sheets of recording materials S in a stacked state. FIG. 1 illustrates a configuration including four recording material supply units 59 arranged vertically. In each recording material supply unit 59, one of recording materials S of different types and sizes is accommodated.

The conveyance unit 50 includes a taking-out roller (not illustrated) that takes out the recording material S from each recording material supply unit 59, a plurality of conveyance rollers 54 that are provided along a predetermined recording material conveyance path and convey the recording material S, and the like. Therefore, the conveyance path of the conveyance unit 50 merges into one path from the plurality of recording material supply units 59. As a result, the conveyance unit 50 conveys the recording material S fed from the recording material supply unit 59 to the image forming device 200 by driving the conveyance rollers 54.

[Image Forming Device]

The image forming device 200 illustrated in FIG. 1 includes an operation display unit 220, a scanner 230, an image former 240, a conveyance unit 250, and the like. In addition, the image forming device 200 includes a resistance detection unit (resistance detection device) 70 that detects the resistance of the recording material S in the housing.

The operation display unit 220 includes an operation unit and a display unit.

The display unit includes, for example, a display device such as a liquid crystal display (LCD). The display unit displays various screens according to an instruction of a display signal input from a controller 90.

The operation unit includes a touch panel formed to cover a display screen of the display unit, and various operation buttons such as a numeric button and a start button. The operation unit outputs an operation signal based on a user's operation to the controller 90 described later. The operation unit receives a control instruction from the user.

The scanner 230 optically scans a document conveyed onto a contact glass from an auto document feeder (ADF) or a document placed on the contact glass. Then, the scanner 230 forms an image of reflected light of light obtained by illuminating and scanning the document from the light source on a light receiving surface of a charge coupled device (CCD) sensor, reads a document image, performs A/D conversion on the read image, and generates image data.

The image former 240 forms an image on the recording material S based on the image data. The image former 240 includes photoreceptor drums 241Y, 241M, 241C, and 241K, charging units 242Y, 242M, 242C, and 242K, exposing units 243Y, 243M, 243C, and 243K, developing units 244Y, 244M, 244C, and 244K, primary transfer rollers 245Y, 245M, 245C, and 245K, which correspond to the respective colors of yellow (Y), magenta (M), cyan (C), and black (K). In addition, the image former 240 includes an intermediate transfer belt 246, a secondary transfer roller 247, and a fixing unit 248.

The charging units 242Y, 242M, 242C, and 242K uniformly charge the photoreceptor drums 241Y, 241M, 241C, and 241K.

The exposing units 243Y, 243M, 243C, and 243K include a laser light source, a polygon mirror, a lens, and the like, and scan and expose the surfaces of the photoreceptor drums 241Y, 241M, 241C, and 241K with a laser beam based on the image data of each color to form electrostatic latent images.

The developing units 244Y, 244M, 244C, and 244K attach toners of the respective colors to the electrostatic latent images on the photoreceptor drums 241Y, 241M, 241C, and 241K to perform development.

The primary transfer rollers 245Y, 245M, 245C, and 245K sequentially transfer toner images of the respective colors formed on the photoreceptor drums 241Y, 241M, 241C, and 241K onto the intermediate transfer belt 246 (primary transfer). That is, a color toner image in which the toner images of four colors are superimposed is formed on the intermediate transfer belt 246.

The secondary transfer roller 247 collectively transfers the color toner images on the intermediate transfer belt 246 onto one surface of the recording material S supplied from the supply tray (secondary transfer).

The fixing unit 248 fixes the toner image onto the recording material S through heating and pressurization, by causing the recording material S to pass through a nip portion formed by a fixing roller and a pressure roller.

An environment measurement unit 249 is disposed in the housing of the image forming device 200, and measures environmental conditions near the image former 240, for example, the temperature and humidity.

The conveyance unit 250 includes a plurality of conveyance rollers 54 that are provided along the predetermined conveyance path and convey the recording material S, and the like. The conveyance unit 250 conveys the recording material S along the predetermined conveyance path in the image forming device 200 by driving the conveyance rollers 54. Then, the recording material S after image formation is conveyed to the post-processing device 300.

In addition, the conveyance unit 250 includes a reverse conveyance unit 251 that reverses the recording material S having passed through the fixing unit 248 from the front to the back and sends the recording material S to the image former 240 again. The reverse conveyance unit 251 branches from the conveyance unit 250 on the downstream side of the fixing unit 248 in the recording material conveyance direction. Then, the reverse conveyance unit 251 switches back the recording material S in the conveyance path to switch the image forming surface of the recording material S in the image former 240 from a first surface side to a second surface side. In addition, the reverse conveyance unit 251 joins the conveyance unit 250 on the upstream side of the secondary transfer roller 247 in the recording material conveyance direction to form one conveyance path.

[Post-Processing Device]

The recording material S that has undergone image formation at the image forming device 200 is conveyed into the post-processing device 300. The post-processing device 300 includes, for example, a plurality of post-processing units. Then, predetermined post-processing is performed at the post-processing units designated by a job. For example, the post-processing device 300 includes post-processing units that perform processing such as perforation, folding, foil stamping, binding, cutting, stapling, gluing, and filing.

In the post-processing device 300, the recording material S that has been conveyed from the image forming device 200 and has undergone image formation processing is conveyed to the post-processing units (not illustrated) by the conveyance unit 350, and undergoes predetermined post-processing. The recording material S conveyed by the conveyance unit 350 is discharged from a discharge unit 351 provided along the conveyance path to a sheet discharge tray 352.

[Resistance Detection Unit]

Figure 2:
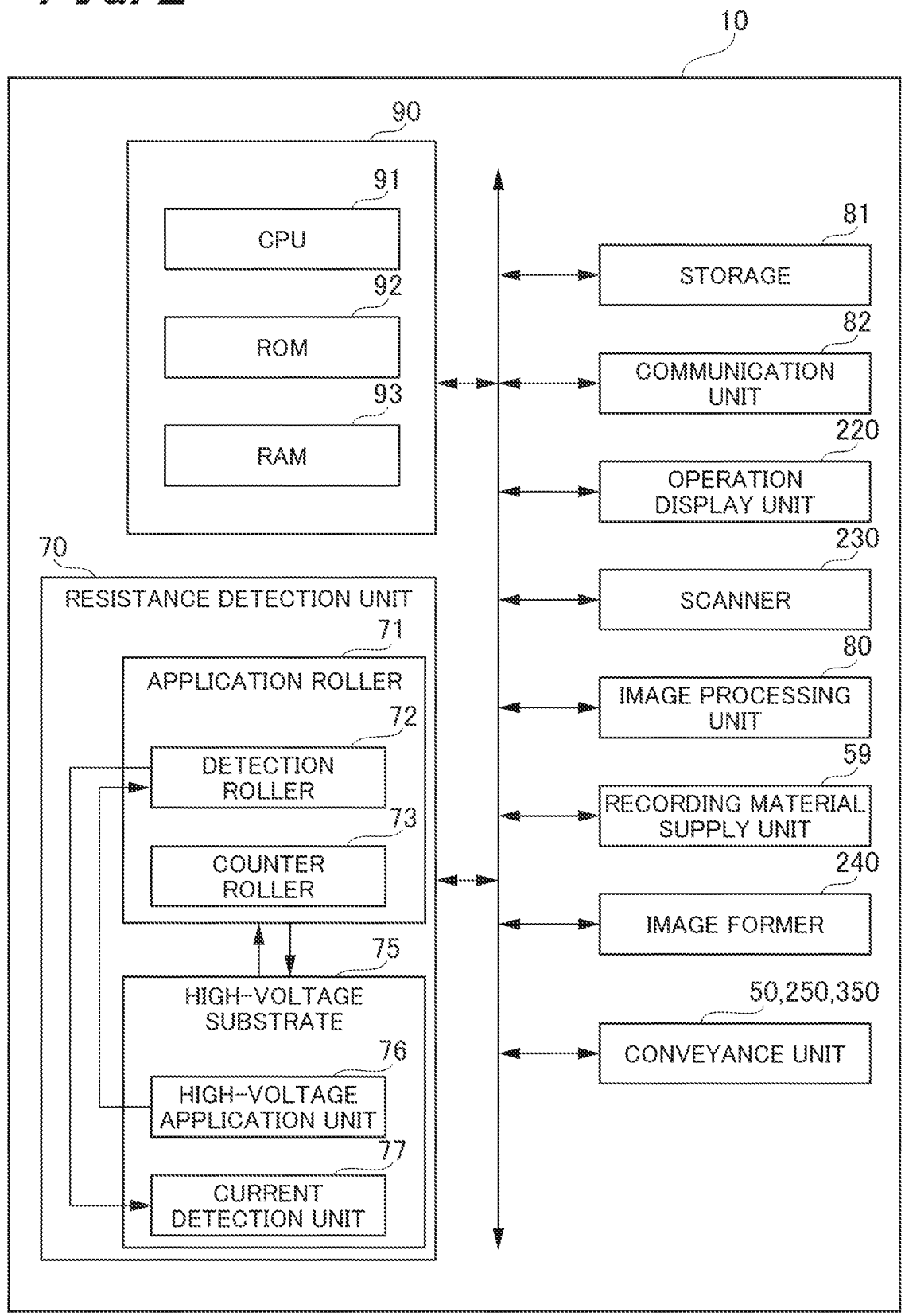
FIG. 2 is a system block diagram of each device constituting the image forming system.

The resistance detection unit 70 detects the resistance of the recording material S conveyed along the conveyance unit 250 based on the control by the controller 90 (FIG. 2).

The resistance detection unit 70 includes application roller 71 and a high-voltage substrate 75 (see FIG. 2). The application roller 71 is a conveyance roller capable of applying a voltage and detecting a current value. The high-voltage substrate 75 applies a high-voltage current to the application roller 71 described later and detects a current flowing between the application rollers 71. The resistance detection unit 70 includes, for example, a known resistance detection device or the like.

FIG. 1 illustrates the application roller 71 that conveys the recording material S and detects the resistance of the recording material S as a part of the resistance detection unit 70. The application roller 71 is disposed on the upstream side of the image former 240 in the recording material conveyance direction in the conveyance unit 250 of the image forming device 200. The application roller 71 includes a roller pair of a detection roller 72 and a counter roller 73. The detection roller 72 detects the current value flowing between the application rollers 71. The counter roller 73 is disposed at a position facing the detection roller 72 across the recording material S conveyed by the conveyance unit 250.

The application roller 71 of the resistance detection unit 70 preferably detects the recording material characteristics in a state where the recording material S is conveyed at a normal conveyance speed during image formation. By detecting the recording material characteristics at the normal conveyance speed, the recording material characteristics can be detected without reducing the productivity of the image formation job.

A high-voltage current is applied from the high-voltage substrate 75 between the application rollers 71 (between the detection roller 72 and the counter roller 73). Then, the amount of current flowing between the application rollers 71 is detected by the high-voltage substrate 75 (see FIG. 2) electrically connected to the detection roller 72. Thus, by measuring the current between the application rollers 71 at the resistance detection unit 70, it is possible to measure the resistance between the detection roller 72 and the counter roller 73 constituting the application rollers 71 and the resistance of the recording material S sandwiched between the application rollers 71.

Note that the resistance detection unit 70 may be configured as a part of the image forming device 200 in the image forming system 10, or may be configured as a resistance detection device independent of the image forming device 200. Also when configured as the resistance detection device independent of the image forming device 200, the resistance detection unit 70 includes the configuration described above and the configuration of the controller related to the resistance detection unit 70 described later.

[System Block Diagram]

FIG. 2 illustrates a system block diagram of each device constituting the above-described image forming system 10 illustrated in FIG. 1. As illustrated in FIG. 2, the image forming system 10 includes the controller 90, a storage 81, a communication unit 82, the operation display unit 220, the scanner 230, an image processing unit 80, the recording material supply unit 59, the image former 240, the resistance detection unit 70, and the conveyance unit 50, 250, 350. Note that, hereinafter, description of configurations overlapping with the description of the image forming system 10 illustrated in FIG. 1 will be omitted.

The controller 90 includes, for example, a central processing unit (CPU) 91, a read only memory (ROM) 92, a random access memory (RAM) 93, and the like. The controller 90 is used as an example of a computer that controls the operation of each unit of the image forming system 10.

The CPU 91 is an example of an arithmetic unit related to the image forming system 10, reads a program code of software related to various processing of the image forming system 10 stored in the ROM 92 (an example of a recording medium), deploys the read program code in the RAM 93, and performs centralized control over the operation of each unit of the image forming system 10 according to the deployed program. Instead of the CPU 91, another arithmetic device such as a micro processing unit (MPU) may be used as the arithmetic unit.

The ROM 92 stores various processing programs for controlling each unit of the image forming system 10, parameters and data tables necessary for executing the programs, various files, and the like.

The RAM 93 includes a volatile semiconductor memory, and forms a work area that temporarily stores various processing programs, input or output data, parameters, and the like read from the ROM 92 in various processing executed and controlled by the CPU 91.

The storage 81 is an example of a recording medium including a nonvolatile storage or the like, and stores various processing programs executed by the CPU 91, programs such as an OS, information on a processing function of the device necessary for executing the programs, image data read by the scanner 230, image data input from a client device (not illustrated) or the like, the resistance of the application roller 71 detected by the resistance detection unit 70, various data tables used for arithmetic operation by the controller 90, and the like. As the storage 81, for example, a hard disk drive (HDD), a solid state drive (SSD), an optical disk, a magneto-optical disk, a CD-ROM, a CD-R, a magnetic tape, a nonvolatile memory card, or the like is used.

The communication unit 82 includes a network interface card (NIC), a modem, and the like, connects the recording material supply device 100, the image forming device 200, and the post-processing device 300 to a communication network such as a local area network (LAN) or a wide area network (WAN), and transmits and receives various data to and from an external information device (for example, the client device).

The operation display unit 220 includes a touch panel or the like provided with a pressure-sensitive or capacitive operation unit (touch sensor) having transparent electrodes disposed in a lattice pattern on a display unit such as a liquid crystal display (LCD) or an organic electro luminescence (EL) display, and functions as a display unit and an operation unit. The display unit displays various operation screens according to a display control signal input from the controller 90. The operation unit receives various input operations by the user and outputs the operation signal to the controller 90.

The scanner 230 optically scans a document placed on the contact glass, forms an image of reflected light from the document on the light receiving surface of the charge coupled device (CCD) sensor, and reads the document image. The image (analog image signal) read by the scanner 230 is subjected to predetermined image processing at the image processing unit 80.

The image processing unit 80 includes a circuit that performs analog-digital (A/D) conversion processing, a circuit that performs digital image processing, and the like. The image processing unit 80 generates digital image data by performing A/D conversion processing on the analog image signal from the scanner 230. In addition, the image processing unit 80 generates the digital image data by analyzing a print job acquired from the external information device (for example, the client device) and rasterizing each page of the document. Then, the image processing unit 80 performs image processing such as color conversion processing, correction processing (shading correction or the like) according to initial settings or user settings, and compression processing on the image data as necessary, and outputs the image data after image processing to the image former 240.

The resistance detection unit 70 includes the application roller 71 described above and the high-voltage substrate 75. In the resistance detection unit 70, the application roller 71 and the high-voltage substrate 75 are electrically connected.

The application roller 71 includes the detection roller 72 and the counter roller 73 serving as a roller pair that conveys the recording material S.

The high-voltage substrate 75 includes a high-voltage application unit 76 and a current detection unit 77. The high-voltage application unit 76 applies a high-voltage current to the application roller 71 according to an instruction from the controller 90. The current detection unit 77 detects the current at the detection roller 72 in response to the high-voltage current applied to the application roller 71.

The resistance detection unit 70 measures the resistance of the application roller 71 and the resistance of the recording material S sandwiched between the application rollers 71 using the application roller 71 and the high-voltage substrate 75. Specifically, the resistance detection unit 70 measures the resistance of only the application roller 71 in a state where the recording material S is not sandwiched, and the total resistance of the application roller 71 and the recording material S in the state where the recording material S is sandwiched.

[Functional Configuration of Controller]

Figure 3:
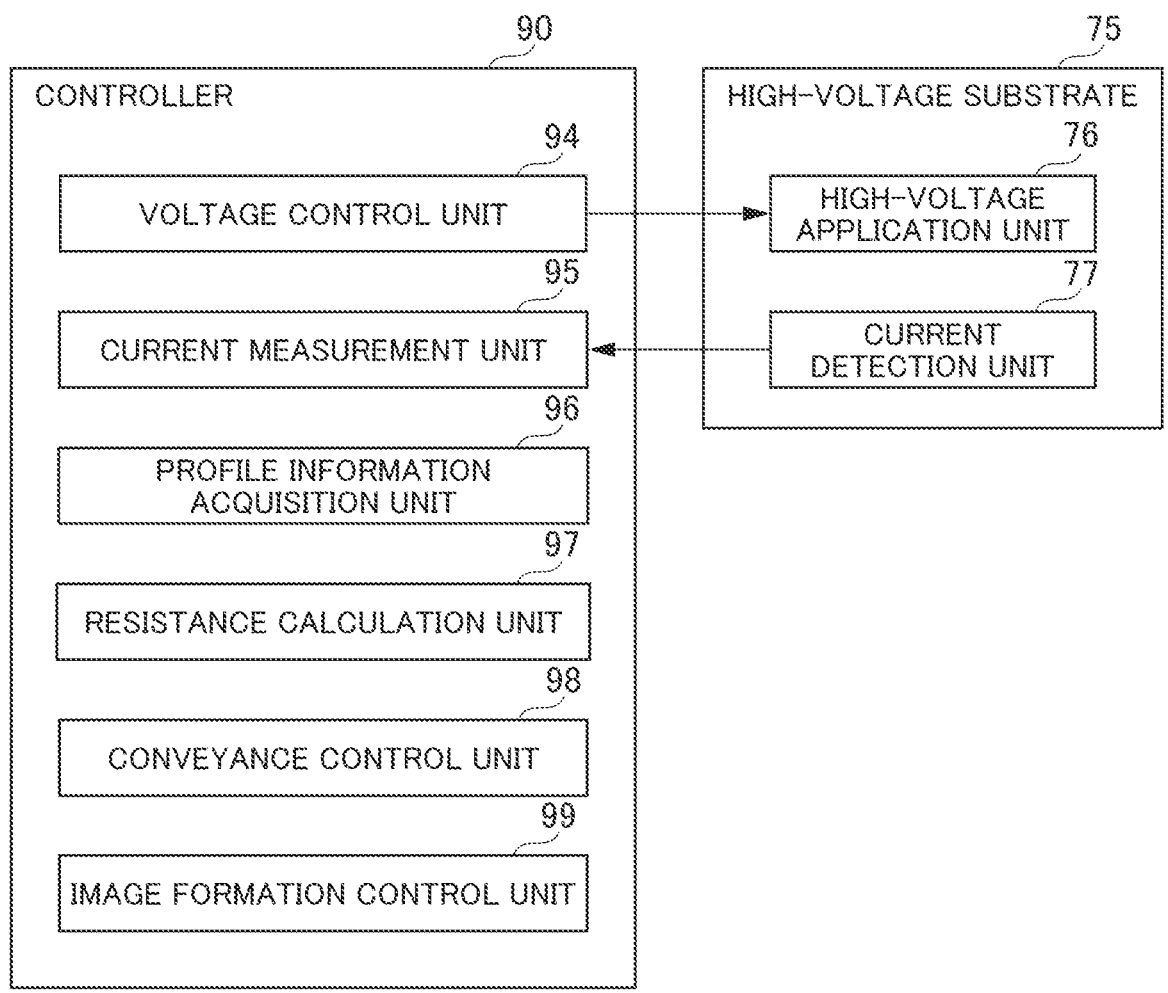
FIG. 3 is a functional block of a controller.

Next, a functional configuration of the controller 90 will be described. FIG. 3 illustrates a functional block diagram of the controller 90. As illustrated in FIG. 3, the controller 90 includes a voltage control unit 94, a current measurement unit 95, a profile information acquisition unit 96, a resistance calculation unit 97, an image formation control unit 99, a conveyance control unit 98, and an image formation control unit 99. Note that, in the functional block diagram illustrated in FIG. 3, only a functional configuration related to resistance detection of the recording material S by the controller 90 is illustrated.

The voltage control unit 94 controls the voltage, the amount of current, and the like of a high-voltage current applied to the high-voltage application unit 76 of the high-voltage substrate 75. Then, the high-voltage application unit 76 applies the high-voltage current to the application roller 71 based on the control of the voltage control unit 94. For example, the voltage control unit 94 changes the voltage of the high-voltage current applied from the high-voltage application unit 76 to the application roller 71.

The current measurement unit 95 measures the amount of current between the application rollers 71 from a current detected by the current detection unit 77 of the high-voltage substrate 75. For example, when a high-voltage current is applied from the high-voltage application unit 76 to the application roller 71 by the voltage control unit 94, the current measurement unit 95 measures a current detected by the current detection unit 77 at the detection roller 72 of the application roller 71. As a result, the current measurement unit 95 measures a current detected by the current detection unit 77 when the voltage applied from the high-voltage substrate 75 is changed. Furthermore, the current measurement unit 95 measures a current detected by the current detection unit 77 when the voltage applied from the high-voltage substrate 75 is changed at the application roller 71 in the state where the recording material S is sandwiched.

When a high-voltage current applied from the high-voltage substrate 75 to the application rollers 71 is changed, the profile information acquisition unit 96 acquires, as first profile information, a change in the measured value of the current flowing between the application rollers 71 corresponding to a change in the applied voltage, or a change in the resistance obtained from the change in the measured value of the current. In addition, when a high-voltage current applied from the high-voltage substrate 75 to the application roller 71 is changed, the profile information acquisition unit 96 acquires, as second profile information, a change in the measured value of the current flowing between the application rollers 71 in the state where the recording material S is sandwiched, or a change in the resistance obtained from the change in the measured value of the current.

That is, the profile information acquisition unit 96 acquires, as the first profile information, only the current and resistance between the application rollers 71 (the detection roller 72 and the counter roller 73) when the applied voltage is changed in the state where the recording material S is not sandwiched.

In addition, the profile information acquisition unit 96 acquires, as the second profile information, the current and resistance between the application rollers 71 when the applied voltage is changed in the state where the recording material S is sandwiched, thereby acquiring the current and resistance of a combination of the application roller 71 (the detection roller 72 and the counter roller 73) and the recording material S.

The resistance calculation unit 97 calculates the resistance of the recording material S at a measurement reference voltage from the first profile information and the second profile information acquired by the profile information acquisition unit 96. The calculation of the resistance of the recording material S at the measurement reference voltage by the resistance calculation unit 97 will be described later.

The conveyance control unit 98 controls the operation of a conveyance mechanism for the recording material S in or between the recording material supply device 100, the image forming device 200, and the post-processing device 300, which constitute the image forming system 10. For example, the conveyance control unit 98 controls the conveyance of the recording material S by controlling the driving of the conveyance unit 50 of the recording material supply device 100, the conveyance unit 250 of the image forming device 200, the conveyance unit 350 of the post-processing device 300, and other conveyance units of the image forming system 10. The conveyance control unit 98 controls the stop of the driving of each drive unit, the timing of the start of the driving, the adjustment of the driving speed, and the like according to conveyance conditions that meet the recording material characteristics of the recording material S. Through this control, the drive units are interlocked between each device of the image forming system 10, and the conveyance of the recording material S in the image forming system 10 is controlled.

In addition, the conveyance control unit 98 detects the arrival of the recording material S at the application roller 71. For example, the conveyance control unit 98 receives a detection signal of the recording material S from each sensor disposed in the conveyance unit 250 of the image forming device 200, and acquires the arrival of the recording material S at a predetermined position and a conveyance state based on these data. Note that, in the image forming system 10, the arrival of the recording material S at the application roller 71 may be acquired without using each sensor, and the position of the recording material S may be acquired from the conveyance speed, the conveyance time, the conveyance distance, and the like of the recording material S.

The image formation control unit 99 controls the image forming operation at the image former 240 of the image forming device 200. In addition, the image formation control unit 99 sets image forming conditions according to the resistance of the recording material S calculated by the resistance calculation unit 97. For example, the image formation control unit 99 acquires the image forming conditions from data stored in the storage 81 or the like according to the resistance of the recording material S calculated by the resistance calculation unit 97. Then, the image formation control unit 99 sets operation conditions for each component of the image former 240 based on the data acquired from the storage 81 or the like. Then, the operation of each component of the image former 240 is controlled according to the set operation conditions to form an image on the recording material S based on the image data.

[Resistance Detection Method]

Next, the method for detecting the resistance of the recording material S by the resistance detection unit 70 and the controller 90 described above will be described.

When detecting the resistance of the recording material S, first, the resistance detection unit 70 and the controller 90 measure the current between the application rollers 71 in the state where the recording material S is not sandwiched by changing the applied voltage.

Then, the resistance detection unit 70 and the controller 90 acquire, as the first profile information, a change in the amount of measured current flowing through only the application roller 71 corresponding to a change in the applied voltage, or a change in the resistance.

Furthermore, the resistance detection unit 70 and the controller 90 measure the current of the application roller 71 in the state where the recording material S is sandwiched by changing the applied voltage. Then, the resistance detection unit 70 and the controller 90 acquire, as the second profile information, a change in the amount of measured current flowing through the application roller 71 and the recording material S corresponding to a change in the applied voltage, or a change in the resistance.

Next, the controller 90 calculates the divided voltage and the resistance of the application roller 71 and the divided voltage and the resistance of the recording material S from mathematical formulas based on the acquired first profile information and second profile information. Then, the controller 90 calculates the resistance value at the measurement reference voltage of the recording material S based on the relationship between the calculated divided voltage and resistance of the recording material S.

The first profile information and the second profile information are preferably acquired after the image formation job is received by the controller 90 and before the image former 240 perform image formation on the recording material S.

Furthermore, when performing the image formation job, the controller 90 preferably acquires again and updates the first profile information and the second profile information after performing the image formation on the predetermined number of sheets of recording materials S. By acquiring the first profile information and the second profile information for each predetermined number of sheets, the controller 90 can accurately calculate the resistance of the recording material S even when the resistance of the recording material S varies during the image formation job.

(Resistance Characteristics of Recording Material and Roller)

A paper sheet and the like used as the recording material S has characteristics attributed to its internal structure that the electric resistance changes according to the applied voltage. As an example of the recording material S, FIGS. 4 and 5 illustrate the internal structure of the paper sheet at the time of voltage application.

Figure 4:
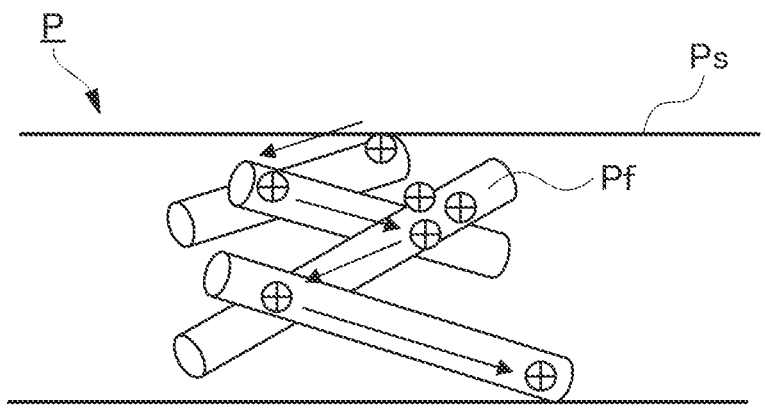
FIG. 4 is a diagram illustrating an internal structure of a paper sheet at the time of voltage application.
Figure 5:
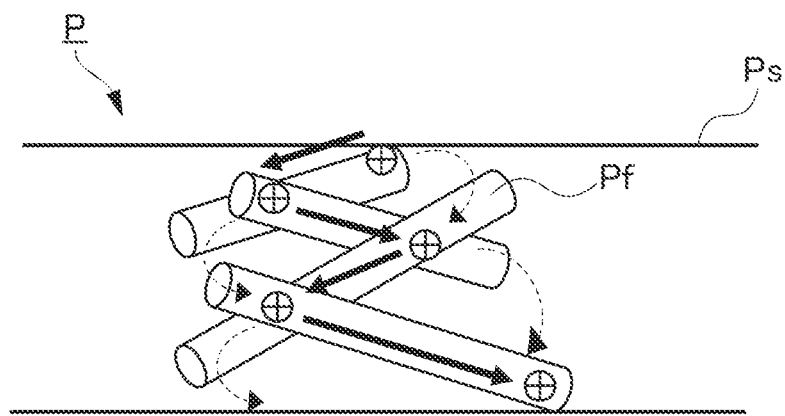
FIG. 5 is a diagram illustrating the internal structure of the paper sheet at the time of voltage application.

As illustrated in FIGS. 4 and 5, the paper sheet P has a structure in which paper fibers Pf, which are main components of the paper sheet P, are intertwined on the inner side of a paper surface Ps.

When a low voltage is applied to the paper sheet P having such a structure, charges (+) move in the fibers Pf, as indicated by arrows in FIG. 4. For this reason, when a current flows from one paper surface Ps to the paper sheet P, charges move in the paper fibers Pf and travel to the other surface. At this time, since the paper fibers Pf themselves have a large electric resistance, an electric field in the paper sheet P weakens, and the charges are less likely to move. In this manner, at a low voltage, the resistance of the paper sheet P tends to be large because the charges are blocked by the structural trap of the paper fibers Pf.

On the other hand, when a high voltage is applied to the paper sheet P, the moving speed of charges in the paper fibers Pf increases as illustrated in FIG. 5. Then, the paper sheet P is energized in such a way that charges accumulated in the structural trap of the paper fibers Pf are pushed out. Furthermore, due to discharge breakdown or a minute short circuit in the fibers Pf, a short circuit allowing the charges to move between the paper fibers Pf close to each other occurs, and a shortcut path is formed. As a result, the resistance of the paper sheet P decreases at a high voltage.

Figure 6:
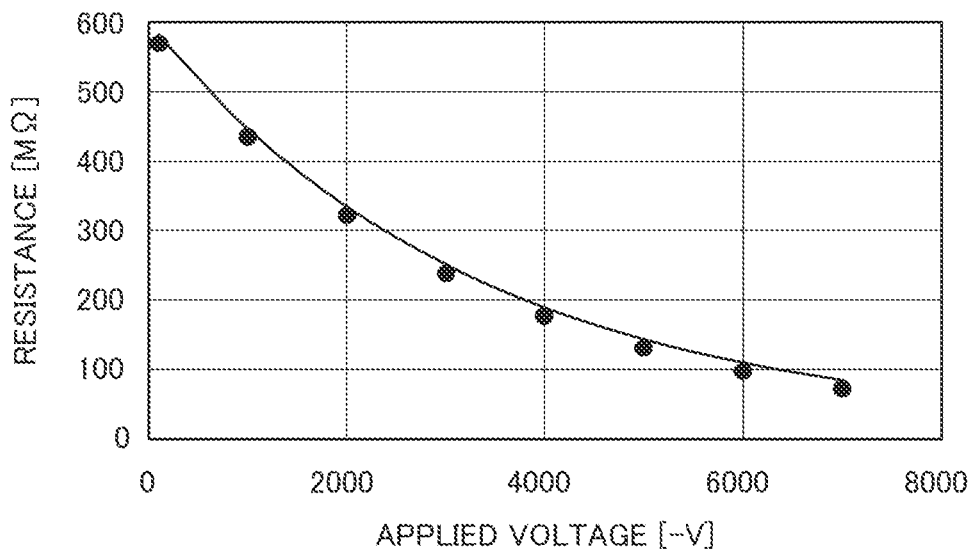
FIG. 6 is a graph illustrating a relationship between an applied voltage and the resistance of a recording material.
Figure 7:
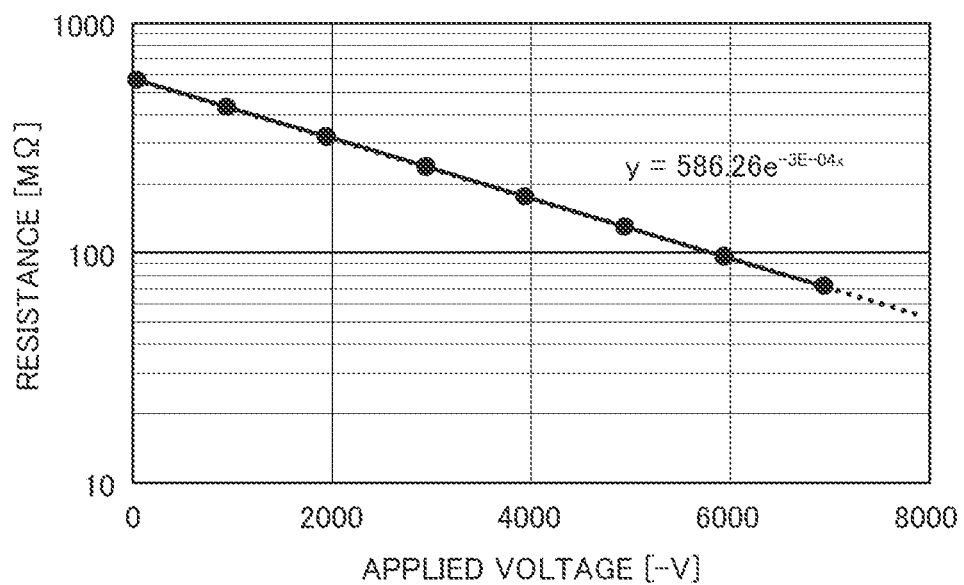
FIG. 7 is a graph illustrating a relationship between the applied voltage and the resistance (logarithm) of the recording material.

FIGS. 6 and 7 are a graph illustrating the above-described relationship between the applied voltage and the resistance of the recording material S. In FIGS. 6 and 7, the horizontal axis represents the applied voltage [V], and the vertical axis represents the resistance [MΩ] of the recording material S.

As illustrated in FIG. 6, in a case where paper or the like is used as the recording material S, the resistance of the recording material S decreases as the applied voltage increases due to the above-described characteristics attributed to the internal structure. The decrease in the resistance of the recording material S can be represented by an exponential function with respect to the increase amount of the applied voltage. Thus, as illustrated in FIG. 7, when the resistance [MSΩ] of the recording material S on the vertical axis is represented by a logarithm, the decrease in the resistance of the recording material S with respect to the increase amount of the applied voltage can be illustrated as a linear graph. FIGS. 6 and 7 illustrate a graph of the exponential function $[y=586.26e^{-3E-04x}]$ as an example of the relationship between the applied voltage and the resistance.

As described above, when the resistance of the recording material S made of paper or the like is detected as a physical property value, it is necessary to detect the resistance by applying a voltage of the same value to the recording material S every time because the resistance of the recording material S changes depending on the applied voltage. Here, the predetermined voltage used for measuring the resistance of the recording material S is referred to as the measurement reference voltage.

In addition, the application roller 71 not only measures the resistance of the recording material S at the detection roller 72 and the counter roller 73 but also is used as a conveyance roller that conveys the recording material S. For this reason, the application roller 71 includes a roller having frictional force allowing the conveyance of the recording material S and conductivity allowing voltage application, for example, an elastic roller having conductivity such as a conductive rubber roller. However, the conductive rubber or the like has a characteristic that electric resistance changes according to the applied voltage.

Figure 8:
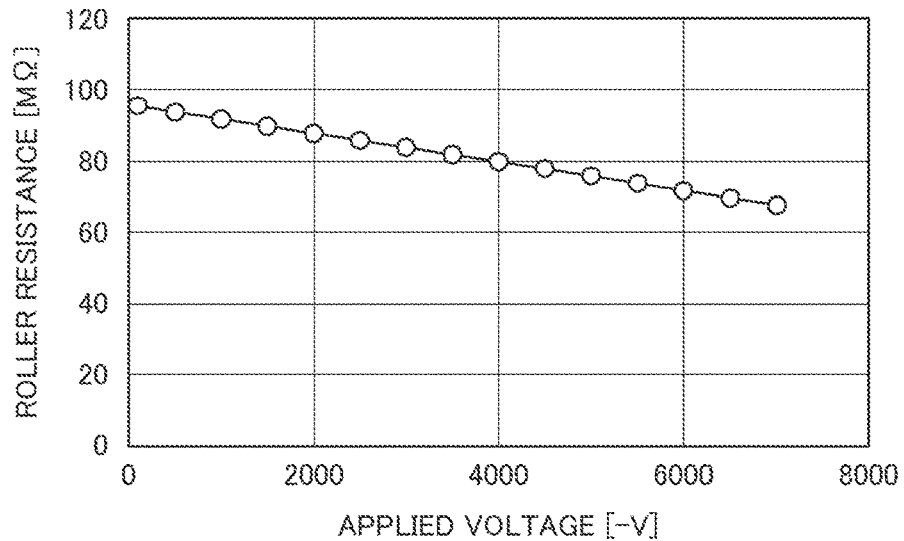
FIG. 8 is a graph illustrating a relationship between the applied voltage and the resistance of an application roller.

FIG. 8 illustrates a graph indicating a relationship between the applied voltage and the resistance of the application roller 71. In FIG. 8, the horizontal axis represents the voltage [V] applied to the application roller 71, and the vertical axis represents the resistance [MΩ] of the application roller 71. As illustrated in FIG. 8, the resistance (roller resistance) of the application roller 71 decreases as the applied voltage increases. The decrease in the roller resistance is represented by a linear graph with respect to the increase amount of the applied voltage, unlike the change in the resistance of the recording material described above (FIG. 6).

In this manner, the resistance of the recording material S such as a paper sheet and the application roller 71 such as a conductive rubber roller changes depending on the applied voltage. Therefore, in the method in which the resistance of the recording material S is obtained from the difference between the resistance value in the state where the recording material S is sandwiched between the application rollers 71 and the resistance of the application roller 71, as in the method described in Patent Literature 1 described above, the measurement reference voltage is not constant and thus the resistance of the recording material S cannot be accurately detected.

Figure 9:
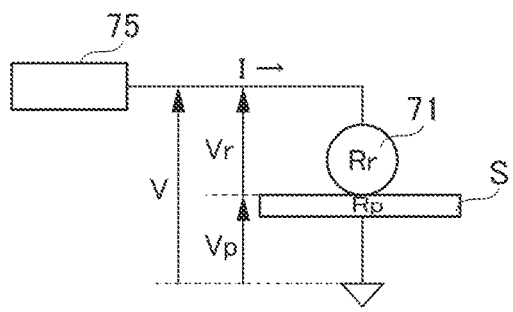
FIG. 9 is a diagram in which a current is applied to the application roller in a state where the recording material is sandwiched.

For example, as illustrated in FIG. 9, in a case where a current I is detected by applying an output voltage V to the application roller 71 in the state where the recording material S is sandwiched, the voltage applied to the application roller 71 (roller applied voltage Vr) can be represented as $[Vr=Rr/(Rr+Rp)\times V]$ using a roller resistance Rr and a recording material resistance Rp.

The voltage applied to the recording material S (recording material applied voltage Vp) at this time is $[Vp=Rp/(Rr+Rp)\times V]$. In this manner, the voltage applied only to the recording material S (recording material applied voltage Vp) is a resistive divided voltage between the recording material S and the application roller 71, and thus, changes according to the recording material resistance and the roller resistance.

Figure 10:
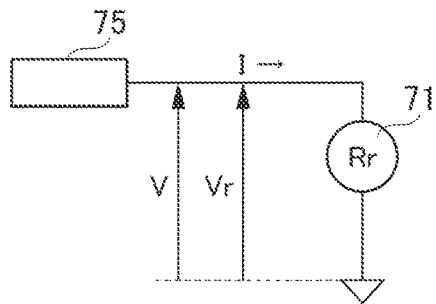
FIG. 10 is a diagram in which a current is applied to the application roller in a state where the recording material is not sandwiched.

On the other hand, as illustrated in FIG. 10, in a case where a current I is detected by applying an output voltage V to the application roller 71 in the state where the recording material S is not sandwiched, that is, only to the application roller 71, the voltage applied to the application roller 71 (roller applied voltage Vr) is $[Vr=V]$. Thus, the roller applied voltage Vr have different values between the application roller 71 that sandwiches the recording material S and only the application roller 71, even when the same voltage V is applied.

As described above, the voltage applied only to the recording material S (recording material applied voltage Vp) is a resistive divided voltage between the recording material S and the application roller 71. For this reason, when the roller applied voltage Vr is different between the state in which the recording material S is sandwiched and the state in which the recording material S is not sandwiched, the recording material applied voltage Vp also changes, and thus the measurement reference voltage for detecting the resistance of the recording material S cannot be made constant.

Furthermore, the roller resistance Rr of the application roller 71 in the state where the recording material S is sandwiched and the roller resistance Rr of only the application roller 71 have different values from each other due to the above-described application characteristics of the rollers. Therefore, the resistance of the recording material S cannot be accurately detected even when the difference between the resistance value (roller resistance Rr+recording material resistance Rp) detected in the state where the recording material S is sandwiched and the resistance value (roller resistance Rr) detected in the state where the recording material S is not sandwiched is obtained.

(Calculation of Profile Information and Resistance)

As described above, even when a constant voltage is applied to the application roller 71, a predetermined measurement reference voltage cannot be applied to the recording material S due to the characteristics of the material included in the application roller 71 such as the conductive rubber roller. Therefore, in order to accurately measure the resistance of the recording material S, it is necessary to perform a detection method that considers the resistance characteristic of the recording material S and the resistance characteristic of the application roller 71.

In the present disclosure, the resistance of the recording material S is calculated as follows.

(Step 1) A change in the current between the application rollers 71 is measured by changing the voltage applied to the application roller 71 in the state where the recording material S is not sandwiched. Then, a change in the current corresponding to a change in the voltage (voltage-current characteristic (=resistance)) of only the application roller 71 is acquired and the change is defined as the first profile information.

(Step 2) A change in the current between the application rollers 71 is measured by changing the voltage applied to the application roller 71 in the state where the recording material S is sandwiched. Then, a change in the current corresponding to a change in the voltage (voltage-current characteristic (=resistance)) of the combination of the recording material S and the application roller 71 is acquired, and the change is defined as the second profile information.

(Step 3) From the first profile information obtained only from the application roller 71 and the second profile information obtained by combining the recording material S and the application roller 71, the divided voltage to the recording material S and the application roller 71, the current to the recording material S and the application roller 71 at the divided voltage, and the resistance between the recording material S and the application roller 71 at the divided voltage are calculated using mathematical formulas.

(Step 4) The relationship between the divided voltage and the resistance of the recording material S is obtained from the calculation results in step 3. Then, the resistance of the recording material S when the voltage (divided voltage) applied to the recording material S is set as the measurement reference voltage is calculated.

Figures 11, 12:
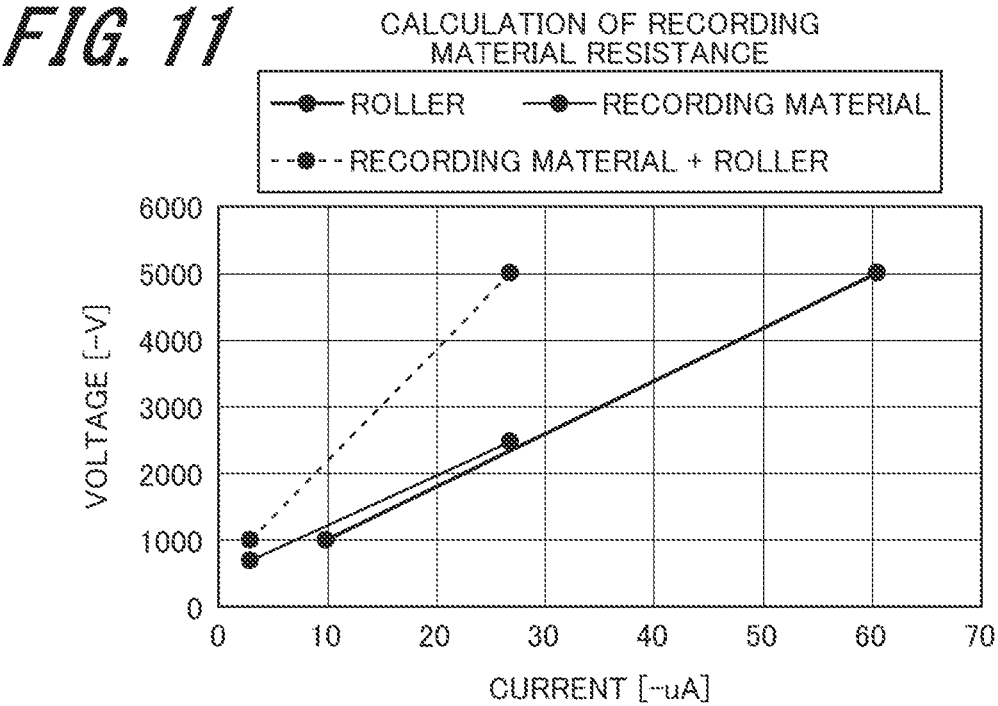
FIG. 11 is a graph of a voltage-current characteristic of the application roller, the recording material and an application roller, and the recording material S obtained in step 1 to step 3.
FIG. 12 illustrates a (voltage-current characteristic (=resistance)) acquired in step 1 and step 2.
Figures 13, 14:
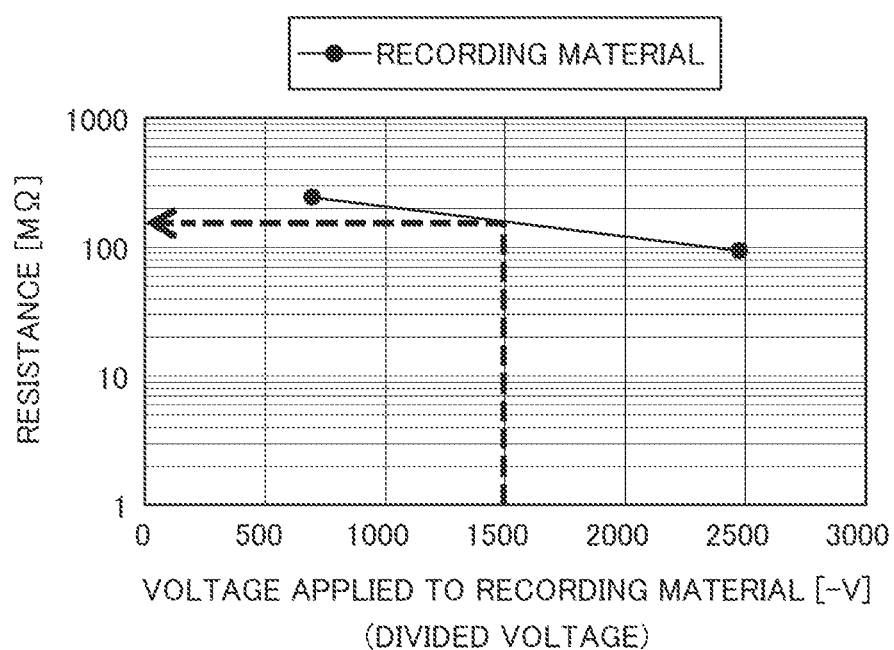
FIG. 13 illustrates a divided voltage, current, and resistance between the recording material and the application roller calculated from the (voltage-current characteristic (=resistance)) illustrated in FIG. 12.
FIG. 14 is a graph illustrating a relationship between the divided voltage and the resistance of the recording material calculated in FIG. 13.

A method for calculating the resistance of the recording material S will be specifically described with reference to FIGS. 11 to 14. FIG. 11 is an example of a graph of the first profile information representing the voltage-current characteristic of the application roller 71, the second profile information representing the voltage-current characteristic of the recording material S and the application roller 71, and the voltage-current characteristic of the recording material S, which are obtained in step 1 to step 3 above. FIG. 12 illustrates a (voltage-current characteristic (=resistance)) acquired in step 1 and step 2, which are the basis of the first profile information and the second profile information illustrated in FIG. 11. FIG. 13 illustrates the divided voltage, current, and resistance between the recording material S and the application roller 71 calculated from the (voltage-current characteristic (=resistance)) illustrated in FIG. 12. FIG. 14 is a graph illustrating a relationship between the divided voltage and the resistance of the recording material S calculated in FIG. 13.

(Step 1)

First, in step 1, the amount of current flowing between the application rollers 71 is measured by changing the voltage applied to the application roller 71 in the state where the recording material S is not sandwiched. In the example illustrated in FIG. 12, the voltage applied to the application roller 71 is changed, and 1000 V and 5000 V are applied as level (1) and level (2), respectively, of the voltage applied to measure the current. Then, the measurement results are obtained, and the current at the applied voltage of 1000 V at level (1) is 9.88 μA (=resistance 101.2 MΩ) and the current at the applied voltage of 5000 V at level (2) is 60.45 μA (=resistance 82.7 MΩ).

These measurement results are indicated, as the first profile information, in the graph of the (voltage-current characteristic) of the roller illustrated in FIG. 11.

(Step 2)

Next, in step 2, the amount of current flowing between the application rollers 71 is measured by changing the voltage applied to the application roller 71 in the state where the recording material S is sandwiched. In the example illustrated in FIG. 12, as in step 1, the current is measured at 1000 V in level (1) and 5000 V in level (2) of the applied voltage. Then, the measurement results of the combination of the recording material S and the application roller 71 are obtained, and the current at the applied voltage of 1000 V at level (1) is 2.89 μA and the current at the applied voltage of 5000 V at level (2) is 26.8 μA.

These measurement results are illustrated, as the second profile information, in the graph of the (voltage-current characteristic) of the recording material+roller in FIG. 11.

(Step 3)

Next, in step 3, the divided voltage, the current, and the resistance are calculated for each of the recording material S and the application roller 71, as illustrated in FIG. 13, from the measurement results of the (voltage-current characteristic) of the first profile information and the second profile information illustrated in FIG. 12.

The resistance of the roller (roller resistance R) illustrated in FIG. 13 is obtained from the first profile information as an estimation function $[R=a \times V+b]$.

In the above formula, a and b can be represented as:

$$[a=(r2-r1)/(v2-v1)],$$

$$[b=r1-(r2-r1)/(v2-v1) \times v1]$$

where the voltage is v1 and the resistance is r1 at level (1) of the first profile information, and the voltage is v2 and the resistance is r2 at level (2).

When these are substituted into the estimation function $[R=a \times V+b]$ and the equation is rearranged, the roller resistance R is represented as:

$$[R=r1+(r2-r1) \times (V-v1)/(v2-v1)].$$

From Ohm's law $[V=R \times I]$, the roller resistance R can be represented as the following formula:

$$[R=(r1 \times v2 - r2 \times v1)/\{(v2-v1)-(r2-r1) \times I\}].$$

Thus, the roller resistance R at the current I can be calculated.

Next, based on the second profile information, the roller resistance R and the divided voltage to the application roller 71 are calculated from the formulas of the roller resistance R and the current I using the current 2.89 μA at level (1) and the current 26.8 μA at level (2). Then, the divided voltage of the recording material S can be obtained from a difference between the calculated divided voltages to the application roller 71 at level (1) and level (2) and the applied voltages at level (1) and level (2). Furthermore, the resistance of the recording material S can be calculated from the divided voltage of the recording material S and the currents at level (1) and level (2) of the second profile information.

When, at level (1), the voltage is V1, the current is I1, the divided voltage of the recording material S is Vp1, the resistance of the recording material S at the divided voltage Vp1 is Rp1, the divided voltage of the application roller 71 is Vr1, and the resistance of the application roller 71 at the divided voltage Vr1 is Rr1 in the second profile information, Vp1 and Rr1 can be represented as:

$$[Vp1=V1-I1 \times Rr1],$$

$$[Rp1=Vp1/I1].$$

In addition, when the voltage is V2, the current is I2, the divided voltage of the recording material S is Vp2, and the divided voltage of the application roller 71 is Vr2 at level (2) of the second profile information, Vp2 and Rr2 can be represented as:

$$[Vp2=V2-I2 \times Rr2],$$

$$[Rp2=Vp2/I2]$$

(Step 4)

In step 3 described above, by calculating the divided voltage and the resistance of the recording material S at level (1) and level (2) of the second profile information, a graph indicating the relationship between the divided voltage and the resistance of the recording material S illustrated in FIG. 14 can be obtained. In the graph illustrated in FIG. 14, as in the graph illustrated in FIG. 7, the relationship between the divided voltage of the recording material S and the resistance of the recording material S represented by an exponential function is illustrated as a linear graph by logarithmically expressing the resistance [MΩ] of the recording material S on the vertical axis.

Then, the resistance of the recording material S at the measurement reference voltage can be calculated by the exponential function represented by the graph. In FIG. 14, as an example of calculating the resistance of the recording material S, the resistance of the recording material S when the measurement reference voltage is 1500 is obtained.

According to the step 1 to step 4 described above, a high-voltage current is applied to the application roller 71 in the state where the recording material S is not sandwiched and in the state where the recording material S is sandwiched and the current of the application roller 71 is detected at the resistance detection unit 70, thereby making it possible to accurately calculate the resistance of the recording material S at the measurement reference voltage.

The voltages applied as level (1) and level (2) are not particularly limited as long as they have different values. The voltage used, the number of times of acquisition, and the like are not particularly limited as long as the first profile information and the second profile information can be acquired using two or more different voltages, As the application roller 71, a conveyance roller disposed on the upstream side of the image former 240 in the recording material conveyance direction, the secondary transfer roller 247 of the image former 240, or an independent roller may be used in the image forming system 10. As the application roller 71, it is preferable to use a conveyance roller disposed on the upstream side of the image former 240 of the image forming device 200 in the recording material conveyance direction, a conveyance roller in the device disposed on the upstream side of the image forming device 200 in the recording material conveyance direction, or the like. In addition, as the application roller 71, a roller independent of the conveyance roller may be used.

[Flowchart of Resistance Detection]

Figure 15:
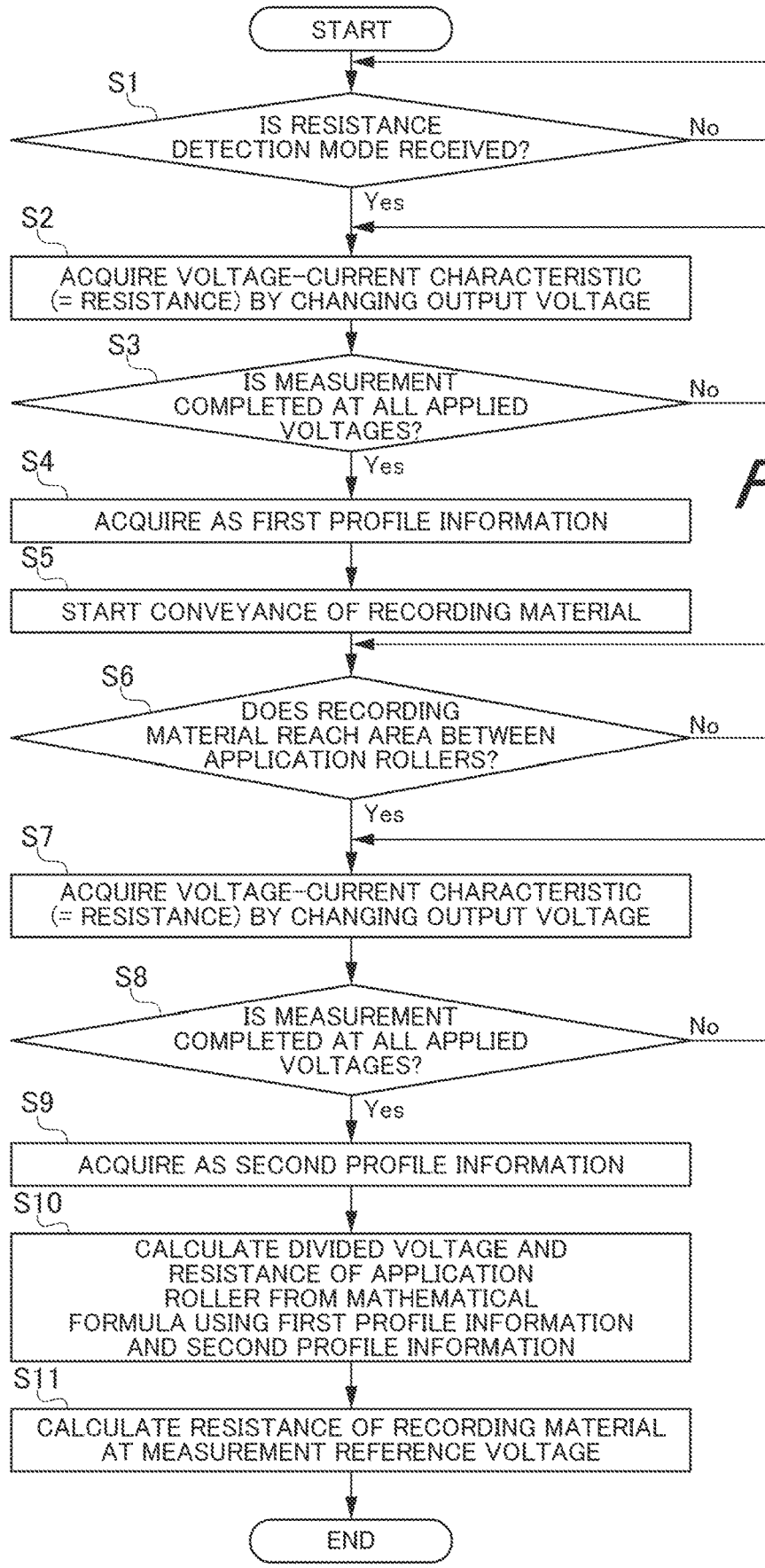
FIG. 15 is a flowchart of a method for detecting the resistance of the recording material.

Next, a flowchart of the method for detecting the resistance of the recording material S by the resistance detection unit 70 and the controller 90 is illustrated in FIG. 15. The processing of the flowchart illustrated in FIG. 15 is executed when the resistance detection unit 70 receives an instruction from the controller 90. The processing of the flowchart illustrated in FIG. 15 is implemented by the CPU 91 of the controller 90 executing a program stored in the ROM 92 or the storage 81 in the image forming system 10.

First, the controller 90 determines whether a detection mode for detecting, at the resistance detection unit 70, the resistance of the recording material S according to an instruction of a user or the like has been received (step S1). When the resistance detection mode of the recording material S has not been received (No in step S1), the processing of step S1 is continued until the resistance detection mode is received.

When the resistance detection mode for the recording material S has been received (Yes in step S1), a change in the current corresponding to a change in the voltage (voltage-current characteristic (=resistance)) of only the application roller 71 is acquired by changing the output voltage to the application roller 71 (step S2). That is, according to (step 1) described above, the voltage control unit 94 of the controller 90 controls the high-voltage application unit 76 of the high-voltage substrate 75 to apply a high-voltage current to the application roller 71. Then, the current measurement unit 95 of the controller 90 controls the current detection unit 77 of the high-voltage substrate 75 to measure a current at the detection roller 72 of the application roller 71. Thus, the current of only the application roller 71 in the state where the recording material S is not sandwiched is measured.

Next, the controller 90 determines whether the change in the current corresponding to the change in the voltage (voltage-current characteristic (=resistance)) of only the application roller 71 has been measured at all the applied voltages (step S3). When the measurement has not been completed at all the applied voltages (No in step S3), the measurement of the (voltage-current characteristic (=resistance)) of the application roller 71 in step S2 is performed by changing the output voltage.

When the measurement has been completed at all the applied voltages (Yes in step S3), the profile information acquisition unit 96 acquires, as the first profile information, the change in the current corresponding to the change in the voltage (voltage-current characteristic (=resistance)) of only the application roller 71 (step S4). Thus, the first profile information including the applied voltage, the detected current, and the resistance of only the application roller 71 in the state where the recording material S is not sandwiched, as illustrated in FIGS. 11 and 12, can be acquired.

Next, the conveyance control unit 98 of the controller 90 starts the conveyance of the recording material S to the image forming device 200 (step S5). The conveyance control unit 98 drives the conveyance unit 50,250, starts the conveyance of the recording material S in the recording material supply device 100, and conveys the recording material S to the resistance detection unit 70.

Then, the controller 90 determines whether the recording material S has reached an area between the application rollers 71 (step S6). When the recording material S has not reached the area between the application rollers 71 (No in step S6), the processing of step S6 is repeated until the recording material S reaches the application roller 71.

When the recording material S has reached the application roller 71 (Yes in step S6), a change in the current corresponding to a change in the voltage (voltage-current characteristic (=resistance)) of the application roller 71 in the state where the recording material S is sandwiched is acquired by changing the output voltage to the application roller 71 (step S7).

That is, according to (step 2) described above, the voltage control unit 94 of the controller 90 controls the high-voltage application unit 76 of the high-voltage substrate 75 to apply a high-voltage current to the application roller 71 in the state where the recording material S is sandwiched. Then, the current measurement unit 95 of the controller 90 controls the current detection unit 77 of the high-voltage substrate 75 to measure a current at the detection roller 72 of the application roller 71. Thus, the current of the application roller 71 in the state where the recording material S is sandwiched is measured.

Next, the controller 90 determines whether the change in the current corresponding to the change in the voltage (voltage-current characteristic (=resistance)) of the application roller 71 in the state where the recording material S is sandwiched has been measured at all the applied voltages (step S8). When the measurement has not been completed at all the applied voltages (No in step S8), the measurement of the (voltage-current characteristic (=resistance)) of the application roller 71 in step S7 is performed by changing the output voltage.

When the measurement has been completed at all the applied voltages (Yes in step S8), the profile information acquisition unit 96 acquires, as the second profile information, the change in the current corresponding to the change in the voltage (voltage-current characteristic (=resistance)) of the application roller 71 in the state where the recording material S is sandwiched (step S9). Thus, the second profile information including the applied voltage, the detected current, and the resistance of the application roller 71 in the state where the recording material S is sandwiched, as illustrated in FIGS. 11 and 12, can be acquired.

Next, the resistance calculation unit 97 of the controller 90 calculates the divided voltage and the resistance of the application roller 71 from mathematical formulas, based on the first profile information and the second profile information acquired by the profile information acquisition unit 96 (step S10). The calculation of the divided voltage and the resistance of the application roller 71 by the resistance calculation unit 97 can be performed by the method illustrated in (step 3) described above. In addition, the divided voltage of the application roller 71 and the resistance of only the application roller 71 at this divided voltage, as illustrated in FIG. 13, can be acquired from the calculation of the divided voltage and the resistance of the application roller 71 by the resistance calculation unit 97.

Next, the resistance calculation unit 97 of the controller 90 calculates the resistance of the recording material S at the measurement reference voltage (step S11). The calculation of the resistance of the recording material S at the measurement reference voltage by the resistance calculation unit 97 can be performed by the methods (step 3) and (step 4) described above. First, the resistance calculation unit 97 obtains the divided voltage of the recording material S from the difference between the applied voltage and the divided voltage of the application roller 71 according to (step 3), and calculates the resistance at the divided voltage of the recording material S. Thus, the divided voltage of the recording material S and the resistance of the recording material S at this divided voltage, as illustrated in FIG. 13, can be calculated.

Then, using the calculated divided voltage and the resistance of the recording material S, the resistance calculation unit 97 obtains the relationship between the divided voltage and the resistance (relational expression: exponential function) of the recording material S according to (step 4). Then, the resistance calculation unit 97 calculates the resistance of the recording material S at the measurement reference voltage from the relationship between the divided voltage and the resistance of the recording material S.

After the resistance of the recording material S at the measurement reference voltage is calculated, the processing according to this flowchart is ended.

In the processing according to the above-described flowchart, a high-voltage current is applied to the application roller 71 at two or more different voltages in each of two states, the state where the recording material S is not sandwiched and the state where the recording material S is sandwiched, and a current at each applied voltage (=resistance) is detected. Thus, in the two states of the state where the recording material S is not sandwiched and the state where the recording material S is sandwiched, the change in the current corresponding to the change in the voltage (voltage-current characteristic (=resistance)) is acquired as the first profile information and the second profile information. Then, the resistance of the recording material S at the measurement reference voltage is calculated based on the first profile information and the second profile information. Through this processing, in the configuration in which a conductive rubber or the like whose electric resistance changes according to the applied voltage is used as the application roller 71, it is possible to appropriately calculate the resistance at the measurement reference voltage of the recording material S made of paper or the like whose electric resistance changes according to the applied voltage due to the internal structure.

Note that the present invention is not limited to the configuration described in the embodiment above, and various modifications and changes can be made without departing from the configuration of the present invention.

Although embodiments of the present invention have been described and illustrated in detail, the disclosed embodiments are made for purposes of illustration and example only and not limitation. The scope of the present invention should be interpreted by terms of the appended claims

DESCRIPTION OF REFERENCE NUMERALS

10 . . . image forming system
50, 250, 350 . . . conveyance unit
54 . . . conveyance roller
59 . . . recording material supply unit
70 . . . resistance detection unit
71 . . . application roller
72 . . . detection roller
73 . . . counter roller
75 . . . high-voltage substrate
76 . . . high-voltage application unit
77 . . . current detection unit
80 . . . image processing unit
81 . . . storage
82 . . . communication unit
90 . . . controller
91 . . . CPU 92 . . . ROM
93 . . . RAM
94 . . . voltage control unit
95 . . . current measurement unit
96 . . . profile information acquisition unit
97 . . . resistance calculation unit
98 . . . conveyance control unit
99 . . . image formation control unit
100 . . . recording material supply device
200 . . . image forming device
220 . . . operation display unit
230 . . . scanner
240 . . . image former
241Y, 241M, 241C, 241K photoreceptor drum
242Y, 242M, 242C, 242K . . . charging unit
243Y, 243M, 243C, 243K . . . exposing unit
244Y, 244M, 244C, 244K . . . developing unit
245Y, 245M, 245C, 245K . . . primary transfer roller
246 . . . intermediate transfer belt
247 . . . secondary transfer roller
248 . . . fixing unit
249 . . . environment measurement unit
251 . . . reverse conveyance unit
300 . . . post-processing device
351 . . . discharge unit
352 . . . sheet discharge tray

The invention claimed is:

1. An image forming system comprising:
an application roller that applies a voltage to a recording material on a conveyance path; and
a hardware processor that calculates an electric resistance of the recording material from a relationship between a voltage applied to the application roller and a current,
wherein, in calculating the electric resistance of the recording material, the hardware processor:
applies a first predetermined voltage to the application roller in a first state where the recording material is not sandwiched by the application roller, and detects a first current flowing through the application roller while the first predetermined voltage is being applied,
applies a second predetermined voltage, which is different in voltage value from the first predetermined voltage, to the application roller in the first state, and detects a second current flowing in the application roller while the second predetermined voltage is being applied,
acquires, as first profile information, a change in current between the detected first current and the detected second current or a change in a resistance of the application roller between when the first predetermined voltage is applied in the first state and when the second predetermined voltage is applied in the first state,
applies, in a second state where the recording material is sandwiched by the application roller, the first predetermined voltage to the application roller, and detects a third current flowing through the application roller while the first predetermined voltage is being applied in the second state,
applies, in the second state, the second predetermined voltage to the application roller, and detects a fourth current flowing through the application roller while the second predetermined voltage is being applied in the second state,
acquires, as second profile information, a change in current between the detected third current and the detected fourth current, or a change in a resistance of the application roller between when the first predetermined voltage is applied in the second state and when the second predetermined voltage is applied in the second state, and
calculates the electric resistance of the recording material at a measurement reference voltage based on the acquired first profile information and the acquired second profile information.

2. The image forming system according to claim 1, wherein
the hardware processor acquires a resistance corresponding to a divided voltage of the application roller based on the first profile information and the second profile information, and calculates a resistance corresponding to a divided voltage of the recording material.

3. The image forming system according to claim 1, comprising
a storage that stores the first profile information and the second profile information.

4. The image forming system according to claim 1, comprising
an image former that forms an image on the recording material,
wherein the hardware processor acquires the first profile information after receiving an image formation job and before performing image formation on the recording material at the image former.

5. The image forming system according to claim 4, wherein
the hardware processor acquires again and updates the first profile information after performing image formation for a predetermined number of sheets in the image formation job.

6. The image forming system according to claim 4, wherein
the hardware processor acquires the second profile information again and calculates an electric resistance of the recording material after performing image formation for a predetermined number of sheets in the image formation job.

7. The image forming system according to claim 1, comprising
an image former that forms an image on the recording material,
wherein the application roller is disposed on an upstream side of the image former.

8. The image forming system according to claim 1, wherein
the application roller is an elastic roller.

9. The image forming system according to claim 1, wherein
the application roller is a conductive rubber roller.

10. The image forming system according to claim 1, wherein
the application roller is an independent roller.

11. A resistance detection device comprising:
an application roller that applies a voltage to a recording material on a conveyance path; and
a hardware processor that calculates an electric resistance of the recording material from a relationship between a voltage applied to the application roller and a current,
wherein, in calculating the electric resistance of the recording material, the hardware processor: applies a first predetermined voltage to the application roller in a first state where the recording material is not sandwiched by the application roller, and detects a first current flowing through the application roller while the first predetermined voltage is being applied, applies a second predetermined voltage, which is different in voltage value from the first predetermined voltage, to the application roller in the first state, and detects a second current flowing in the application roller while the second predetermined voltage is being applied, acquires, as first profile information, a change in current between the detected first current and the detected second current or a change in a resistance of the application roller between when the first predetermined voltage is applied in the first state and when the second predetermined voltage is applied in the first state, applies, in a second state where the recording material is sandwiched by the application roller, the first predetermined voltage to the application roller, and detects a third current flowing through the application roller while the first predetermined voltage is being applied in the second state, applies, in the second state, the second predetermined voltage to the application roller, and detects a fourth current flowing through the application roller while the second predetermined voltage is being applied in the second state, acquires, as second profile information, a change in current between the detected third current and the detected fourth current, or a change in a resistance of the application roller between when the first predetermined voltage is applied in the second state and when the second predetermined voltage is applied in the second state, and calculates the electric resistance of the recording material at a measurement reference voltage based on the acquired first profile information and the acquired second profile information.

12. A method for detecting a resistance of a recording material using an application roller that applies a voltage to the recording material on a conveyance path, and a hardware processor that calculates an electric resistance of the recording material from a relationship between a voltage applied to the application roller and a current, the method comprising:

applying a first predetermined voltage to the application roller in a first state where the recording material is not sandwiched by the application roller, and detecting a first current flowing through the application roller while the first predetermined voltage is being applied;

applying a second predetermined voltage, which is different in voltage value from the first predetermined voltage, to the application roller in the first state, and detecting a second current flowing in the application roller while the second predetermined voltage is being applied;

acquiring, as first profile information, a change in current between the detected first current and the detected second current or a change in a resistance of the application roller between when the first predetermined voltage is applied in the first state and when the second predetermined voltage is applied in the first state;

applying, in a second state where the recording material is sandwiched by the application roller, the first predetermined voltage to the application roller, and detecting a third current flowing through the application roller while the first predetermined voltage is being applied in the second state;

applying, in the second state, the second predetermined voltage to the application roller, and detecting a fourth current flowing through the application roller while the second predetermined voltage is being applied in the second state;

acquiring, as second profile information, a change in current between the detected third current and the detected fourth current, or a change in a resistance of the application roller between when the first predetermined voltage is applied in the second state and when the second predetermined voltage is applied in the second state; and calculating an electric resistance of the recording material at a measurement reference voltage based on the acquired first profile information and the acquired second profile information.

13. A non-transitory recording medium storing a computer readable program causing a computer to perform:

applying, to an application roller that applies a voltage to a recording material on a conveyance path, a first predetermined voltage in a first state where the recording material is not sandwiched by the application roller, and detecting a first current flowing through the application roller while the first predetermined voltage is being applied;

applying a second predetermined voltage, which is different in voltage value from the first predetermined voltage, to the application roller in the first state, and detecting a second current flowing in the application roller while the second predetermined voltage is being applied;

acquiring, as first profile information, a change in current between the detected first current and the detected second current or a change in a resistance of the application roller between when the first predetermined voltage is applied in the first state and when the second predetermined voltage is applied in the first state;

applying, in a second state where the recording material is sandwiched by the application roller, the first predetermined voltage to the application roller, and detecting a third current flowing through the application roller while the first predetermined voltage is being applied in the second state;

applying, in the second state, the second predetermined voltage to the application roller, and detecting a fourth current flowing through the application roller while the second predetermined voltage is being applied in the second state;

acquiring, as second profile information, a change in current between the detected third current and the detected fourth current, or a change in a resistance of the application roller between when the first predetermined voltage is applied in the second state and when the second predetermined voltage is applied in the second state; and calculating an electric resistance of the recording material at a measurement reference voltage based on the acquired first profile information and the acquired second profile information.

* * * * *